US006920475B1

(12) United States Patent
Klots et al.

(10) Patent No.: US 6,920,475 B1
(45) Date of Patent: Jul. 19, 2005

(54) COMMUNICATION ARCHITECTURE FOR DISTRIBUTED COMPUTING ENVIRONMENT

(75) Inventors: Boris Klots, Belmont, CA (US); Roger Bamford, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/298,603

(22) Filed: Apr. 23, 1999

(51) Int. Cl.$^7$ ............................................. G06F 15/16
(52) U.S. Cl. ..................... 709/201; 709/203; 709/205; 709/218; 709/105
(58) Field of Search ................................ 709/201–205, 709/213, 218, 200, 206, 217, 219, 226, 227, 250, 215, 106, 216, 318, 220, 330, 210, 229, 223, 224, 101, 238, 261; 719/310, 312, 330, 316, 315, 328; 718/103–108; 370/392–396; 714/712; 712/21; 345/502; 710/200, 22; 711/141, 114; 707/101, 106, 10, 201, 8, 103; 379/230, 265; 713/201; 717/1, 137; 359/172; 700/2

(56) References Cited

U.S. PATENT DOCUMENTS

| | | | | |
|---|---|---|---|---|
| 4,320,502 A | * | 3/1982 | deVeer ........................ 370/461 |
| 4,414,624 A | * | 11/1983 | Summer et al. .............. 712/21 |
| 5,321,808 A | * | 6/1994 | Rupp ........................... 345/502 |
| 5,341,477 A | * | 8/1994 | Pitkin et al. ................. 709/226 |
| 5,437,031 A | * | 7/1995 | Kitami ......................... 719/312 |
| 5,566,022 A | * | 10/1996 | Segev .......................... 359/172 |
| 5,617,568 A | * | 4/1997 | Ault et al. .................... 707/101 |
| 5,634,127 A | * | 5/1997 | Cloud et al. ................. 719/313 |
| 5,644,720 A | * | 7/1997 | Boll et al. .................... 709/227 |
| 5,682,534 A | * | 10/1997 | Kapoor et al. ............... 719/328 |
| 5,684,807 A | * | 11/1997 | Bianchini et al. ............ 714/712 |
| 5,706,427 A | * | 1/1998 | Tabuki ......................... 713/201 |
| 5,742,677 A | * | 4/1998 | Pinder et al. ................. 380/4 |
| 5,742,812 A | * | 4/1998 | Baylor et al. ................. 707/8 |
| 5,745,683 A | * | 4/1998 | Lee et al. ..................... 709/250 |
| 5,745,687 A | * | 4/1998 | Randell ........................ 709/201 |
| 5,761,507 A | * | 6/1998 | Govett ......................... 709/101 |
| 5,761,696 A | * | 6/1998 | Giordano et al. ............. 711/6 |
| 5,774,660 A | | 6/1998 | Brendel et al. |

(Continued)

FOREIGN PATENT DOCUMENTS

| EP | 0865180 A2 | 9/1998 |
|---|---|---|
| EP | 0890901 A1 | 1/1999 |

OTHER PUBLICATIONS

Gaines et al, WebMap: Concept Mapping on the Web, www..wj3.com/1/gaines. 134/paper/134.*

(Continued)

*Primary Examiner*—Jack Harvey
*Assistant Examiner*—Thong Vu
(74) *Attorney, Agent, or Firm*—Hickman Palermo Truong & Becker LLP; Edward A. Becker (57) ABSTRACT

A communication architecture for performing work in a distributed computing environment involves client processes on client nodes sending work requests to a director. The director examines the work requests to determine one or more resources required to perform the work as well as one or more server nodes that can provide the required resources. The director then forwards the work requests to server processes on the server nodes that can provide the required resources. The work requests provided to the server processes specify that the work results are to be provided directly from the server processes to the client processes that made the work requests. The director maintains a table of resource data that specifies the services and/or resources that are provided by and/or made available on the server nodes in the distributed computing environment.

22 Claims, 5 Drawing Sheets

U.S. PATENT DOCUMENTS

| | | | | |
|---|---|---|---|---|
| 5,774,668 | A | | 6/1998 | Choquier et al. |
| 5,790,541 | A | * | 8/1998 | Patrick et al. ............... 370/392 |
| 5,835,724 | A | * | 11/1998 | Smith .......................... 709/227 |
| 5,884,313 | A | * | 3/1999 | Talluri et al. .................. 707/10 |
| 5,887,134 | A | * | 3/1999 | Ebrahim ...................... 709/200 |
| 5,893,097 | A | * | 4/1999 | Hayata et al. ................. 707/10 |
| 5,896,506 | A | * | 4/1999 | Ali et al. ..................... 709/213 |
| 5,915,112 | A | * | 6/1999 | Boutcher ..................... 709/330 |
| 5,915,252 | A | * | 6/1999 | Misheski et al. ....... 707/103 R |
| 5,950,203 | A | * | 9/1999 | Stakuis et al. ................. 707/10 |
| 5,961,584 | A | * | 10/1999 | Wolf ........................... 718/103 |
| 5,969,967 | A | * | 10/1999 | Aahlad et al. .................. 700/2 |
| 6,006,258 | A | * | 12/1999 | Kaljan ......................... 709/219 |
| 6,014,702 | A | * | 1/2000 | King et al. .................. 709/227 |
| 6,038,565 | A | * | 3/2000 | Nock ........................... 707/101 |
| 6,052,712 | A | * | 4/2000 | Badovinatz et al. ......... 709/205 |
| 6,067,561 | A | * | 5/2000 | Dilloon ........................ 709/206 |
| 6,088,769 | A | * | 7/2000 | Luick et al. ................. 711/141 |
| 6,112,243 | A | * | 8/2000 | Downs et al. .............. 709/226 |
| 6,112,281 | A | * | 8/2000 | Bamford et al. ............. 711/141 |
| 6,115,611 | A | * | 9/2000 | Kimoto et al. ............... 455/456 |
| 6,128,644 | A | * | 10/2000 | Nozaki ........................ 709/203 |
| 6,145,084 | A | * | 11/2000 | Zuili et al. .................... 713/201 |
| 6,151,639 | A | * | 11/2000 | Tucker et al. ................ 719/316 |
| 6,192,389 | B1 | * | 2/2001 | Ault et al. ................... 709/101 |
| 6,195,680 | B1 | * | 2/2001 | Goldszmidt et al. ......... 709/203 |
| 6,201,862 | B1 | * | 3/2001 | Mercouroff et al. ......... 379/230 |
| 6,212,640 | B1 | * | 4/2001 | Abdelnur et al. ............ 713/201 |
| 6,216,150 | B1 | * | 4/2001 | Badovinatz et al. ......... 718/106 |
| 6,230,193 | B1 | * | 5/2001 | Arunkumar et al. ......... 709/218 |
| 6,243,737 | B1 | * | 6/2001 | Flanagan et al. ............ 709/202 |
| 6,266,406 | B1 | * | 7/2001 | Mercouroff et al. ......... 379/230 |
| 6,304,908 | B1 | * | 10/2001 | Kalajan ....................... 709/229 |
| 6,324,589 | B1 | * | 11/2001 | Chessell ..................... 709/316 |
| 6,327,607 | B1 | * | 12/2001 | Fant ............................ 709/201 |
| 6,360,262 | B1 | * | 3/2002 | Guenthner et al. .......... 709/226 |
| 6,366,926 | B1 | * | 4/2002 | Pohmann et al. ............ 707/104 |
| 6,374,286 | B1 | * | 4/2002 | Gee et al. .................... 718/108 |
| 6,408,342 | B1 | * | 6/2002 | Moore et al. ................ 719/330 |
| 6,412,034 | B1 | * | 6/2002 | Chan ........................... 710/200 |
| 6,438,744 | B2 | * | 8/2002 | Toutonghi et al. ........... 717/137 |
| 6,446,136 | B1 | * | 9/2002 | Pohmann et al. ............ 709/318 |
| 6,457,049 | B2 | * | 9/2002 | Lewis et al. ................. 709/223 |
| 6,473,617 | B1 | * | 10/2002 | Larsen et al. ................ 455/446 |
| 6,493,750 | B1 | * | 12/2002 | Mathew et al. .............. 709/220 |
| 6,493,768 | B1 | * | 12/2002 | Boutcher ..................... 719/330 |
| 6,535,916 | B1 | * | 3/2003 | Nguyen ....................... 709/224 |
| 6,567,848 | B1 | * | 5/2003 | Kusuda et al. ............... 709/219 |
| 6,567,857 | B1 | * | 5/2003 | Gupta et al. ................. 709/238 |
| 6,580,715 | B1 | * | 6/2003 | Bare ............................ 370/396 |
| 6,615,245 | B1 | * | 9/2003 | McFall et al. ............... 709/213 |
| 6,728,748 | B1 | * | 4/2004 | Mangipudi et al. .......... 718/105 |
| 6,728,788 | B1 | * | 4/2004 | Ainsworth et al. .......... 719/330 |
| 6,779,017 | B1 | * | 8/2004 | Lamberton et al. .......... 709/203 |
| 6,826,756 | B1 | * | 11/2004 | Herrod et al. ............... 719/310 |

OTHER PUBLICATIONS

Colajani et al, Dynamic Load Balancing in Georgraphically Distributed Heterogeneous Web Servers, IEEE May 1998.*

On–line Reorganization of Data in Scalable Continuous Media..—Ghandeharizadeh, Kim (1996).*

An Improved Algorithm for Parallel Sparse LU Decomposition..—Koster, Bisseling (1994). www.,math.uu.nl/people/bisselin/splu.ps.gz.*

Pthreads for Dynamic Parallelism—Narlikar, Blelloch (1998) reports–archive.adm.cs.cmu.edu/anon/1998/CMU–CS–98–114.ps.*

Compiler and Run–Time Support for Adaptive Load Balancing..—loannidis, Dwarkadas (1998) www.cs.rochester.edu/u/sandhya/papers/lcr98_loadbalance.ps.*

A Maximum Likelihood Approach to Nonlinear Blind Source..—Pajunen, Karhunen (1997); www.cis.hut.fi/~ppajunen/papers/icann97.ps.gz.*

Automating Type–safe RPC—Silva (1995) ; bruxelas.inesc.pt/~mms/documents/ride–proceedings.ps.*

Technical Report Security in Client–Server Communication..—Gerald Volkmann; wwwrn.inf.tu–dresden.de/~gerald/papers/techreport.ps.Z.*

RFC1045 ;. Mapping Data Structures . . . Server responds directly to the Client. A forwarded Request is illustrated . . . module handles the return to the invoking call directly.; scitsc.wlv.ac.uk/rfc/rfc10xx/RFC1045.html.*

Scalable Web Server Cluster Design with Workload–Aware..—Cherkasova, Karlsson; www.hpl.hp.com/personal/Lucy_Cherkasova/papers/wecwis–ward–ieee.ps.*

World–Wide Web Proxies—Luotonen, Altis (Researchindex) (1994) (Make Corrections) .citeseer.nj.nec.com/luotonen94worldwide.html.*

Andrew D. Birrell, et al., "Implementing Remote Procedure Calls," ACM Transactions on Computer Systems, vol. 2, No. 1, Feb. 1, 1984, pp. 39–59.

* cited by examiner

COMMUNICATION ARCHITECTURE FOR DISTRIBUTED COMPUTING ENVIRONMENT

FIELD OF THE INVENTION

The present invention relates to distributed computing, and more specifically, to a communication architecture for a distributed computing environment.

BACKGROUND OF THE INVENTION

In a distributed computing environment, work can be performed on multiple computing entities, often referred to as "nodes." In the context of distributed computing, the term "work" refers to any processing of data. One example of a node is a computer system on which one or more processes or threads may execute. Nodes in a distributed computing environment are typically communicatively coupled, for example via a network, to allow processes on nodes to access resources on other nodes. In a hardware context, a resource is generally a device such as a printer, disk drive or memory. In a software context, a resource is generally an item of data or a routine.

An important concern in distributed computing is how to provide communication between processes on different nodes to ensure that work is completed in an orderly and efficient manner. Two such prior approaches include the direct communication architecture and the managed communication architecture.

DIRECT COMMUNICATION ARCHITECTURE

Figure 1:
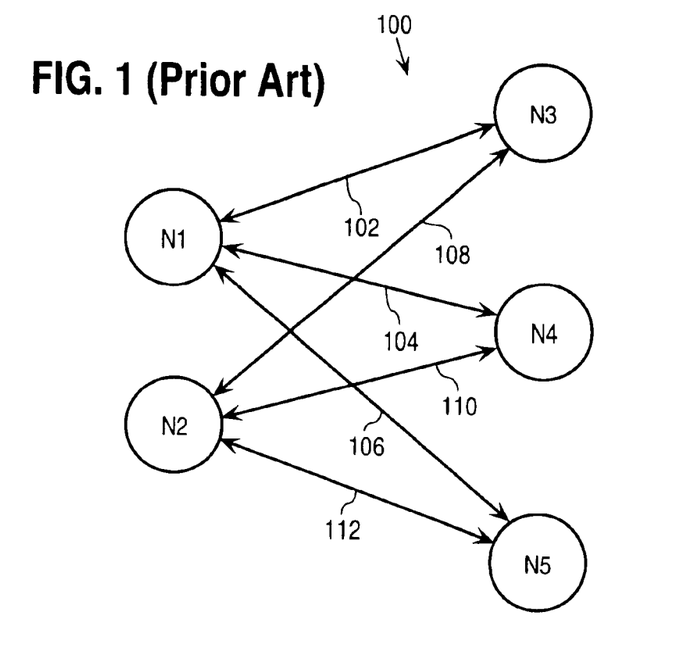
FIG. 1 is a block diagram illustrating a conventional distributed computing system that uses a direct communication architecture to perform work.

According to the direct communication architecture, processes communicate directly with processes on other nodes to request that work be performed and to obtain work results. FIG. 1 illustrates a distributed computing system 100 that uses a direct communication architecture approach. Distributed computing system 100 includes nodes N1–N5. Nodes N1 and N2 are each communicatively coupled to nodes N3–N5 via that provide for the exchange of data between nodes N1 and N2 and nodes N3–N5. Specifically, node N1 is connected to node N3 via connection 102, to node N4 via connection 104 and to node N5 via connection 106. Node N2 is connected to node N3 via connection 108, to node N4 via connection 110 and to node N5 via connection 112.

A node having processes that require work to be performed is referred to herein as a "client" node. Processes on client nodes that require work to be performed are client processes. A node having processes that provide a service to and/or perform work on behalf of processes on other nodes is referred to herein as a "server" node. Processes on server nodes that provide a service and/or perform work on behalf of client processes are server processes. Sometimes nodes have both client processes and server processes executing thereon and therefore the "client node" and "server node" terminology is used herein to aid in understanding prior approaches and embodiments of the invention.

In distributed computing system 100, nodes N1 and N2 are client nodes while nodes N3–N5 are server nodes. When a particular client process on client node N1 requires work to be performed on server node N3, the particular client process sends a request directly to a server process on node N3 over connection 102. The request may be in any form, for example a remote procedure call (RPC). The process on server node N3 performs the requested work and provides the results directly to the particular client process. Work is similarly performed on server nodes N3–N5 on behalf of client processes on client node N2.

According to the direct communication architecture approach, client processes communicate directly with server processes that can perform work for the client processes. A disadvantage of this approach is that client processes must know which server process can perform the required work. When the services offered by any of the server processes change, the client nodes must be made aware of the change. Similarly, when a new service is provided, the client processes must be made aware of the new server node. The services offered by a server process can change when either the operations performed by the server process change or when the resources that a server process operates on change. For distributed computing systems with a large number of client processes and server nodes, a significant amount of system resources can be required to keep all of the client processes updated.

MANAGED COMMUNICATION ARCHITECTURE

According to the managed communication architecture approach, client processes send work requests to a management process referred to herein as a "director." The director forwards the work requests to the appropriate server process that can perform the required work. After performing the work, the server processes send the work results to the director, which forwards the work results to the client process that made the original work request.

Figure 2:
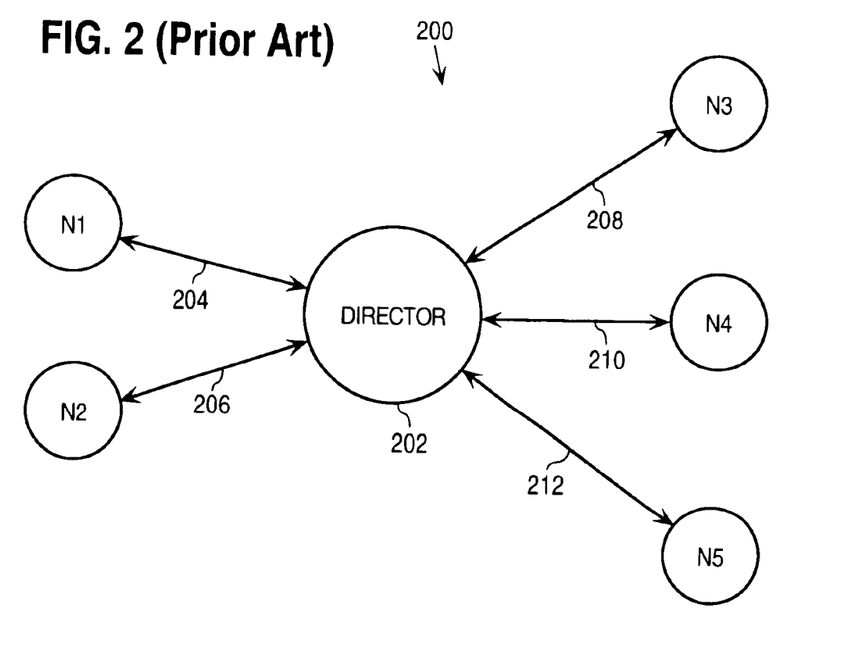
FIG. 2 is a block diagram illustrating a conventional distributed computing system that uses a managed communication architecture to perform work.

FIG. 2 illustrates a distributed computing system 200 that uses a managed communication architecture approach. Distributed computing system 200 includes client nodes N1 and N2 and server nodes N3–N5. Client nodes N1 and N2 are each communicatively coupled to a director 202 via connections 204 and 206, respectively. Client processes on client nodes N1 and N2 submit work requests to director 202 via connections 204 and 206. Director 202 determines which of the server nodes N3–N5 can perform the requested work and forwards the work requests to the appropriate server process on server node N3–N5 on connections 208, 210 and 212, respectively. After the appropriate server process has performed the requested work, the server process provides the work results to director 202. Director 202 then forwards the work results to the client process that requested the work.

According to the managed communication architecture approach, director 202 keeps track of the services provided by server nodes N3–N5. As a result, when a change in services offered by server nodes N3–N5 occurs, only director 202 has to be informed and not client processes on client nodes N1 and N2. This reduces the amount of system resources required to keep track of changes in services offered by server nodes N3–N5, particularly when there are a large number of server nodes. However, the managed communication architecture approach requires more system resources than the direct communication architecture to manage the additional messaging traffic associated with director 202. For example, for a single work request, the direct communication architecture approach requires two messages, one message from a client process to a server process and one message from the server process back to the client process. To process the same work request, the managed communication architecture requires four messages, one from the client process to the director, one from the director to the server process, one from the server process back to the director and one from the director back to the client process.

Based on the need to perform work in a distributed computing environment and the limitations in the prior communication architectures, a communication architecture for a distributed computing environment that avoids the limitations in the approaches previously described is highly desirable.

SUMMARY OF THE INVENTION

According to one aspect of the invention, a method is provided for processing data on a distributed computing system that includes a plurality of nodes. The method comprises the steps of, in response to receiving a first work request to perform first work from a first process on a first node, determining based upon the first work that the first work is to be performed on a second node and providing the first work request to a second process on the second node. The first work request specifies that the first process is to receive results of the first work directly from the second process.

According to another aspect of the invention, a method is provided for processing data on a distributed computing system that includes a plurality of nodes. A director receives a first remote procedure call from a first client process on a first client node. The first remote procedure call requests that first work be performed and that results of the first work be provided directly to the first client process. The director examines the first remote procedure call and determines that a first server process on a first server node is to perform the first work. Then the director provides the first remote procedure call to the first server process.

According to another aspect of the invention, a distributed computing system for performing work comprises a plurality of nodes and a director communicatively coupled to the plurality of nodes. The director is configured to, in response to a first work request to perform first work from a first process on a first node, determine that the first work is to be performed on a second node from the plurality of nodes. The director is further configured to request that the first work be performed by a second process on the second node and that first results of the first work be provided from the second process directly to the first process.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Functional Overview

In general, the communication architecture for performing work in a distributed computing environment, according to an embodiment of the invention, involves client processes on client nodes sending work requests to a director. The director examines the work requests to determine resources and/or services that are required to perform the requested work. The director then forwards the work requests to server processes on server nodes that can perform the requested work. The work requests provided to the server processes specify that work results are to be provided directly from the server processes to the client processes that made the work requests. Consequently, server processes provide their work results directly to the client processes that requested the work, thereby bypassing the director. This approach eliminates the need for client processes to be aware of the services provided by the server processes and nodes while requiring relatively fewer system resources than conventional managed communication architectures.

Detailed Description

Figure 3:
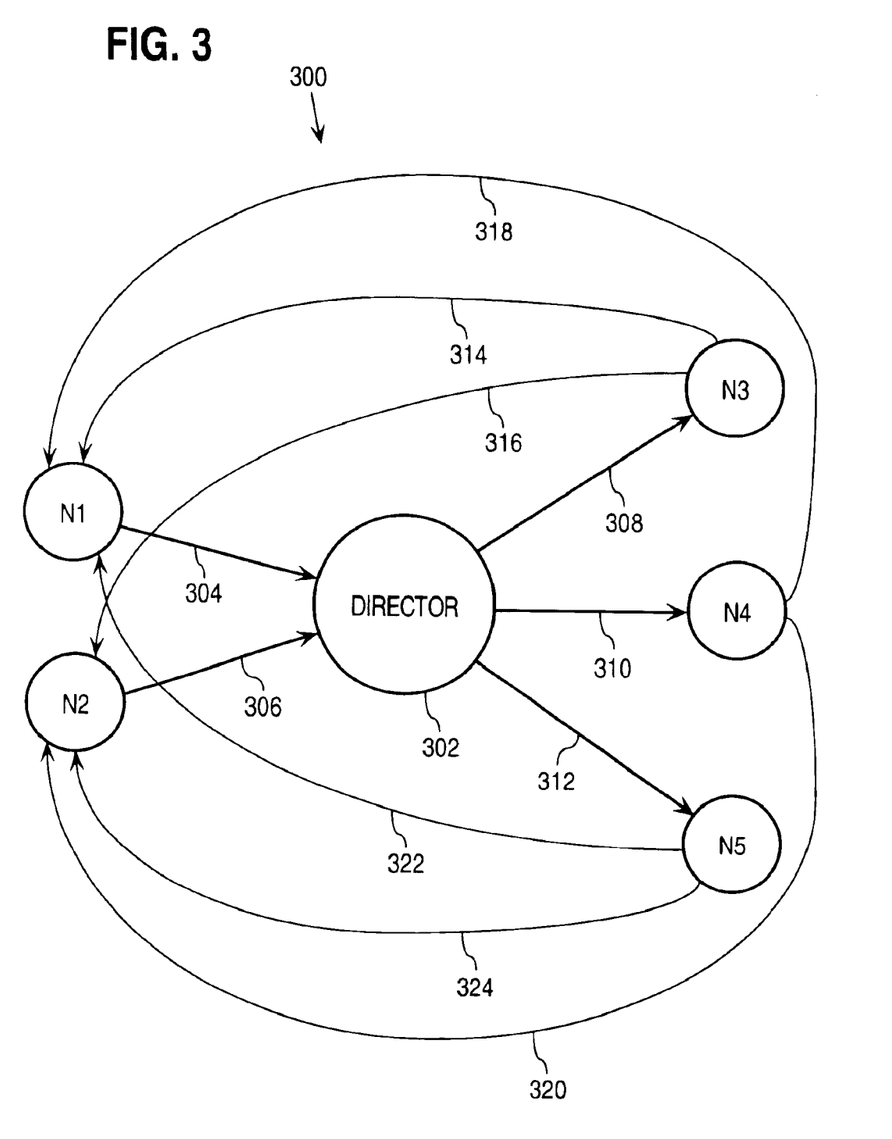
FIG. 3 is a block diagram illustrating a distributed computing system using a communication architecture to perform work according to an embodiment of the invention.

FIG. 3 illustrates a distributed computing system 300 that uses a communication architecture for performing work according to an embodiment of the invention. Distributed computing system 300 includes client nodes N1 and N2 and server nodes N3–N5. Client nodes N1 and N2 are each communicatively coupled to a director 302 via connections 304 and 306, respectively. Client processes on client nodes N1 and N2 submit work requests to director 302 via connections 304 and 306. Director 302 determines which of the server nodes N3–N5 can perform the requested work and forwards the work requests to a server process on one or more of server nodes N3–N5 on connections 308, 310 and 312, respectively. Director 302 then forwards the work request to the particular server process. The work requests specify where the results of performing the requested work are to be sent, i.e. to client node N1 or N2. Director 302 is described in more detail hereinafter.

After the server processes on server nodes N3–N5 have performed the requested work, server nodes N3–N5 provide the work results directly to the client processes on client nodes N1 and N2 that made the work request, bypassing director 302. Specifically, server processes on server node N3 provide work results to client processes on client nodes N1 and N2 via connections 314 and 316, respectively. Server processes on server node N4 provide work results to client processes on client nodes N1 and N2 via connections 318 and 320, respectively. Server processes on server node N5 provide work results to client processes on client nodes N1 and N2 via connections 322 and 324, respectively.

Figure 4:
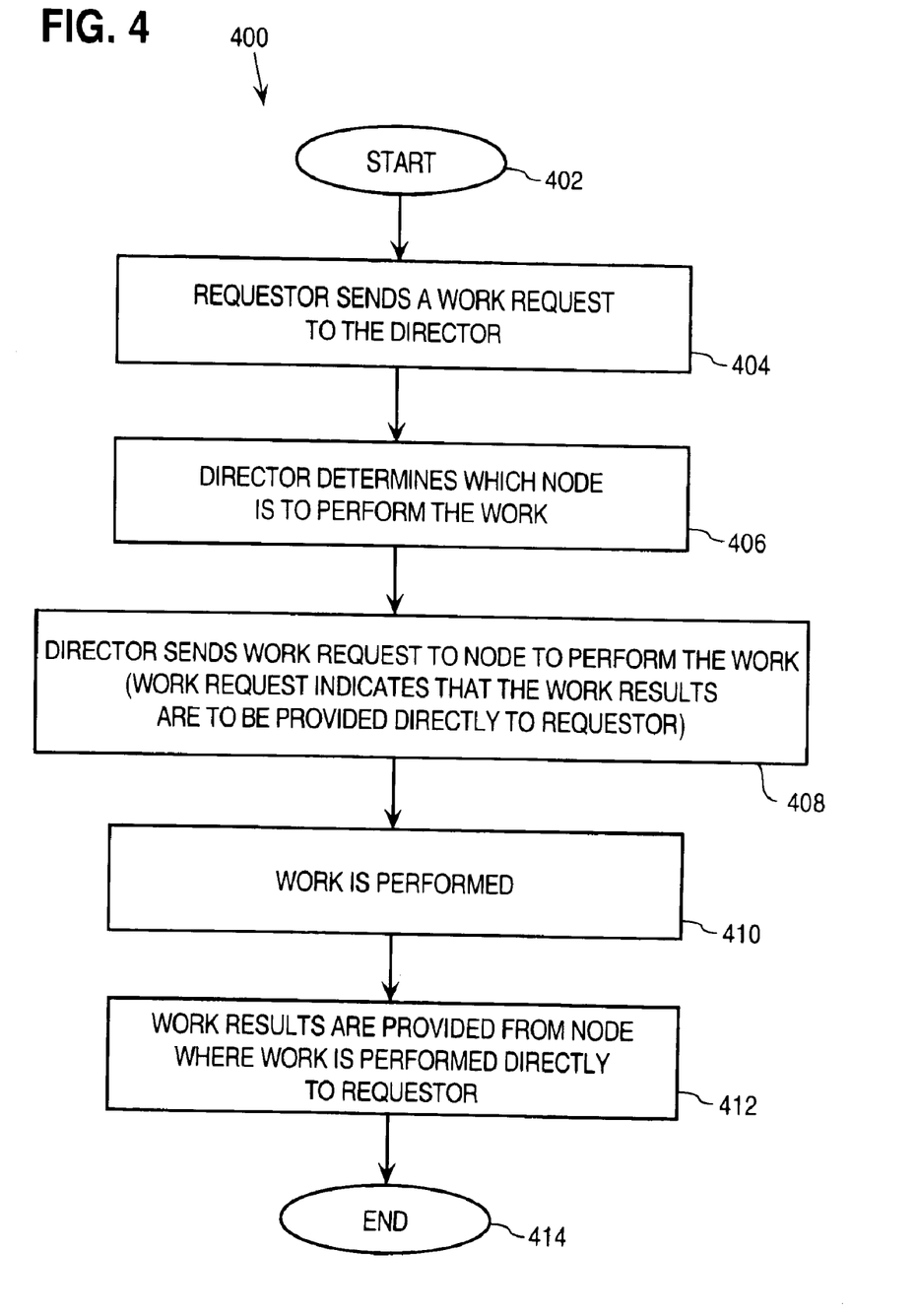
FIG. 4 is a flow chart illustrating an approach for performing work in a distributed computing system according to an embodiment of the invention.

The approach for performing work on a distributed computing system is now described with reference to both the block diagram of FIG. 3 and the flow chart 400 of FIG. 4. Referring to FIG. 4, after starting in step 402, in step 404 a requester, e.g. a client process on client node N1, sends a work request to director 302 over connection 304 or 306. In step 406, director 302 examines the work request and determines which of the server nodes N3–N5 can perform the requested work. According to one embodiment of the invention, director 302 examines the work request to identify the service required to perform the requested work, where a service is a particular operation on a particular resource. Director 302 then compares the required service to services supported by server nodes N3–N5 to determine which server node N3–N5 can provide the required service.

According to another embodiment of the invention, director 302 determines which of the server nodes N3–N5 can provide the required service by determining the particular server process on server nodes N3–N5 that holds the exclusive rights (i.e. a lock) to a resource required by the service.

In step 408, director 302 sends the work request to a server process on one or more of server nodes N3–N5 that can perform the requested work. The work request sent to the server process on one or more of server nodes N3–N5 specifies that the work results are to be sent directly to the client process on client node N1 or N2 that requested the work be performed.

For example, suppose a client process on client node N1 sends a particular work request to perform particular work to director 302 over connection 304. Director 302 examines the particular work request and determines that a server process on server node N3 can perform the particular work. Director 302 forwards the particular work request to the server process on server node N3. The particular work request sent to the to the server process on server nodes N3 specifies that the results of the particular work are to be sent to the client process on client node N1.

The particular work request sent by the client process on client node N1 may specify that the client process on client node N1 is to receive the results of the particular work. According to another embodiment of the invention, the particular work request from client node N1 does not specify that client node N1 is to receive the results of the particular work. In this situation, director 302 determines where the work request originated, i.e. client node N1, and generates a new particular work request that specifies where the results of the particular work are to be sent, i.e. the client process on client node N1.

In situations where the requested work requires resources on more than one server node, a work request is sent to a server process on each server node where work is to be performed. Each work request specifies the client node where the work results are to be sent. For example, suppose for the particular work request from client node N1 that director 302 determines that both server nodes N3 and N4 are required to perform the particular work. Director 302 provides a work request to server processes on both server node N3 and N4. Both work requests specify that the client process on client node N1 is to receive the results of the particular work.

In step 410 the work is performed at the server nodes N3–N5 that received the work request. In step 412, the work results are provided from the server processes on server nodes N3–N5 that performed the work directly to the client process on client node N1 or N2 that requested the work on connection 314, 316, 318, 320, 322 or 324. For example, if a client process on client node N1 had requested the work and director 302 sent the work request to server process on server node N3, then the server process on server node N3 provides the work results to a client process on client node N1 on connection 314. If the work request was sent to a server process on server nodes N4 and N5, then the work results are provided to client node N1 on connections 318 and 322, respectively. The process is complete in step 414.

The Director

Director 302 may be implemented on one or more client nodes N1 and N2, server nodes N3–N5, or one or more other nodes (not illustrated) in distributed computing system 300. More than one director may be used in a distributed computing system. For example, in a distributed computing system having a large number of client nodes, using several directors can improve system performance by reducing the number of work requests that are processed by a single director. For example, in a distributed computing system having thirty (30) client nodes and five (5) server nodes, three (3) directors may be used. Each director services ten (10) client nodes and provides work requests to all five (5) server nodes.

As previously described, director 302 keeps track of the services provided by server process executing on server nodes N3–N5 so that work requests can be forwarded to the correct server node N3–N5. According to one embodiment of the invention, director 302 maintains the global state of server nodes N3–N5 and the server processes executing thereon. Then director 302 implements logic to determine which server process holds the exclusive rights to a resource required to process a work request.

Figure 5:
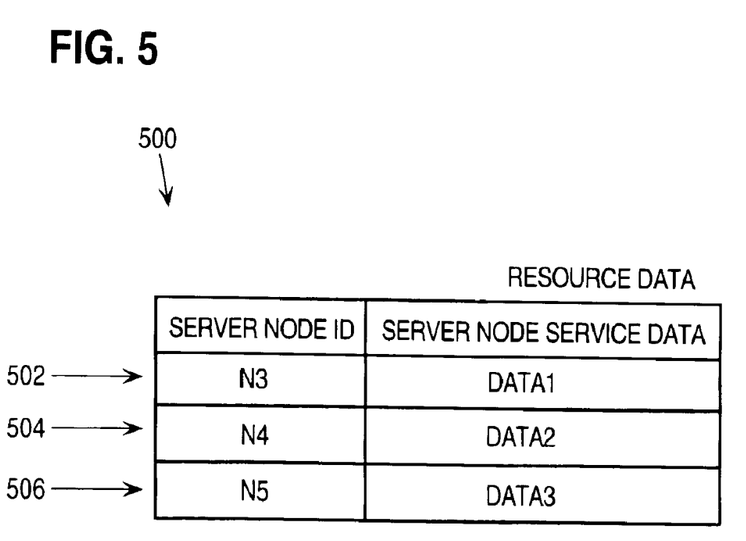
FIG. 5 is a resource data table according to an embodiment of the invention.

FIG. 5 is a table 500 of resource data maintained by director 302 according to an embodiment of the invention. Table 500 includes entries 502, 504 and 506 for each server node N3–N5 in distributed computing system 300. Each entry 502, 504 and 506 specifies the server node that the entry 502, 504 and 506 is associated with (SERVER NODE ID) and data that specifies the services and/or resources provided by and/or available on the associated server node (SERVER NODE SERVICE DATA). For example, entry 502 is associated with server node N3 and contains data (DATA 1) that specifies the services provided by server node N3.

Any change in services provided by server nodes N3–N5 is reflected in table 500. In addition, if a new server node (not illustrated) is added to distributed computing system 300, then a new entry is added to table 500 for the new server node. Similarly, if a server node N3–N5 is removed from distributed computing system 300, then the entry 502, 504, 506 associated with the removed server node N3–N5 is removed from table 500.

Implementation Mechanisms

The communication architecture for performing work in a distributing computing system as described herein may be implemented in discrete hardware circuitry, in computer software, or a combination of discrete hardware circuitry and computer software. The communication architecture described herein in accordance with the present invention is not limited to a particular type of messaging protocol. For example, node-to-node communication may be implemented with remote procedure calls (RPCs) or any other messaging protocol for requesting that work be performed on a remote node.

Figure 6:
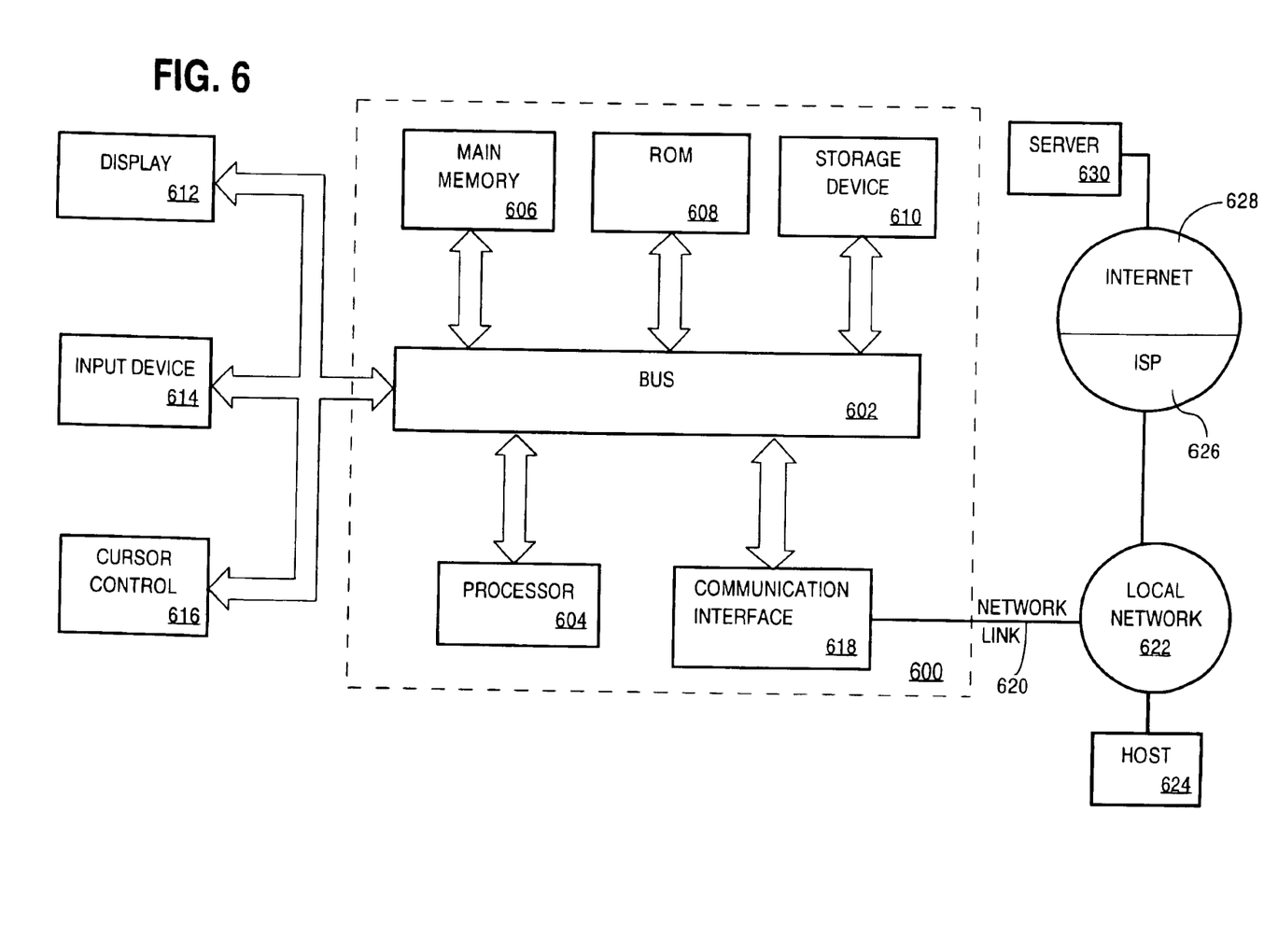
FIG. 6 is a block diagram of a computer system on which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing a communication architecture for a distributed computing system. According to one embodiment of the invention, a communication architecture for a distributed computing system is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for implementation of a communication architecture for a distributed computing system as described herein.

The received code may be executed by processor 604 as it is received, and/or stored in storage device 610, or other non-volatile storage for later execution. In this manner, computer system 600 may obtain application code in the form of a carrier wave.

The communication architecture described herein provides several advantages over prior communication architectures for distributed computing environments. First, the use of a director to forward work requests to server nodes eliminates the need for client nodes to know what services are provided by client nodes. As a result, client nodes do not have to be made aware of changes in the services offered by server nodes. In addition, the approach requires fewer message transfers to perform work and provide work results to a client process than the managed communication architecture approach since work results are provided by server nodes directly to client nodes. For example, to process a work request, embodiments of the present invention require three messages instead of four messages as required by managed communication architecture approaches. Specifically, the three messages include one from a client process to the director, one from the director to a server process and one from the server process back to the client process.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing data on a distributed computing system that includes a plurality of nodes, the method comprising:

maintaining mapping data that specifies work that can be performed by the plurality of nodes;

in response to receiving, from a first process on a first node from the plurality of nodes, a first work request to perform first work, determining based upon the first work and the mapping data, that a first portion of the first work is to be performed on a second node from the plurality of nodes and that a second portion of the first work is to be performed on a third node from the plurality of nodes;

providing a second work request to a second process on the second node, wherein the second work request specifies that the first portion of the first work is to be performed and that results of performing the first portion of the first work are to be provided directly to the first process; and providing a third work request to a third process on the third node, wherein the third work request specifies that the second portion of the first work is to be performed and that results of performing the second portion of the work are to be provided directly to the first process.

2. The method as recited in claim 1, further comprising in response to receiving from the first process a second request to perform second work, determining based upon the second work and the mapping data, that the second work is to be performed on the third node from the plurality of nodes, and providing the second request to the third process on the third node, wherein the second request specifies that the first process is to receive results of the second work directly from the third process.

3. The method as recited in claim 1, further comprising in response to receiving, from the third process on the third node, second request to perform second work, determining based upon the second work and the mapping data, that the second work is to be performed on the second node, and providing the second request to the second process, wherein the second request specifies that the third process is to receive results of the second work directly from the second process.

4. The method as recited in claim 1, further comprising in response to receiving a second request to perform second work from the third process on the third node from the plurality of nodes, determining based upon the second work and the mapping data, a fourth node from the plurality of nodes on which the second work is to be performed, and providing the second request to a fourth process on the fourth node, wherein the second request specifies that the third process is to receive results of the second work directly from the fourth process.

5. The method as recited in claim 1, wherein the step of determining that the first portion of the first work is to be performed on the second node includes determining one or more resources required to perform the first portion of the portion of the first work on the one or more resources.

6. The method as recited in claim 1, wherein:

determining that the first portion of the first work is to be performed on a second node from the plurality of nodes includes the step of a director determining that the first portion of the first work is to be performed on a second node from the plurality of nodes, and providing the second work request to a second process on the second node includes the director providing the second work request to a second process on the second node.

7. The method as recited in claim 1, further comprising upon completion of the first portion of the first work, the second process providing the results of performing the portion of the first work directly to the first process.

8. The method as recited in claim 1, wherein the second work request is a remote procedure call.

9. A distributed computing system for performing work, the distributed computing system comprising:

a plurality of nodes; and a director communicatively coupled to the plurality of nodes, the director being configured to maintain mapping data that specifies work that can be performed by the plurality of nodes, in response to receipt, from a first process on a first node from the plurality of nodes, of a first work request to perform first work, derermine based upon the first work and the mapping data, that a first portion of the first work is to be performed on a second node from the plurality of nodes and that a second portion of the first work is to be performed on a third node from the plurality of nodes and provide a second work request to a second process on the second node, wherein the second request specifies that the first portion of the first work is to be performed and that results of performing the first portion of the first work are to be provided directly to the first process; and provide a third work request to a third process on the third node, wherein the third work request specifies that the second portion of the first work is to be performed and that results of performing the second portion of the first work are to be provided derectly to the first process.

10. The distrbuted computing system as recited in claim 9, wherein the director is further configured to provide the second work request to the second process.

11. The distributed computing system as recited in claim 9, further comprising resource data that specifies the access rights of the plurality of nodes relative to resources.

12. A computer-readable medium carrying instructions for processing data on a distributed computing system that includes a plurality of nodes, wherein processing of the instructions by one or more processors, cause:

maintaining mapping data that specifies work that can be performed by the plurality of nodes;

in response to receiving, from a first process on a first node from the plurality of nodes, a first work request to perform first work, determining based upon the first work and the mapping data, that a first portion of the first work is to be performed on a second node from the plurality of nodes and that a second portion of the first work is to be performed on a third node from the plurality of nodes;

providing a second work request to a second process on the second node, wherein the second work request specifies that the first portion of the first work is to be performed and that results of performing the first portion of the first work are to be provided directly to the first process;

providing a third work request to a third process on the third node, wherein the third work request specifies that the second portion of the first work is to be performed and that results of performing the second portion of the first work are to be provided directly from the third node to the first process.

13. The computer-readable medium as recited in claim 12, further comprising additional instructions which, when executed by the one or more processors, cause in response to receiving from the first process a second request to perform second work, determining based upon the second work and the mapping data, that the second work is to be performed on the third node from the plurality of nodes, and providing the second request to the third process on the third node, wherein the second request specifies that the first process is to receive results of the second work directly from the third process.

14. The computer-readable medium as recited in claim 12, further comprising additional instructions which, when executed by the one or more processors, cause in response to receiving, from a third process on a third node from the plurality of nodes, a second request to perform second work, determining based upon the second work and the mapping data, that the second work is to be performed on the second node, and providing the second request to the second process, wherein the second request specifies that the third process is to receive results of the second work directly from the second process.

15. The computer-readable medium as recited in claim 12, further comprising additional instructions which, when executed by the one or more processors, cause in response to receiving a second request to perform second work from a third process on a third node from the plurality of nodes, determining based upon the second work and the mapping data, a fourth node from the plurality of nodes on which the second work is to be performed, and providing the second request to a fourth process on the fourth node, wherein the second request specifies that the third process is to receive results of the second work directly from the fourth process.

16. The computer-readable medium as recited in claim 12, wherein determining that the first portion of the first work is to be performed on a second node includes determining one or more resources required to perform the first portion of the first work, and determining which of the plurality of nodes is allowed to perform the first portion of the first work on the one or more resources.

17. The computer-readable medium as recited in claim 12, wherein:

determining that the first portion of the first work is to be performed on a second node from the plurality of nodes includes the step of a director determining that the first portion of the first work is to be performed on a second node from the plurality of nodes, and providing the first work request to a second process on the second node includes the step of the director providing the first work request to a second process on the second node.

18. The computer-readable medium as recited in claim 12, further comprising additional instructions which, when executed by the one or more processors, cause upon completion of the first portion of the first work, the second process providing the results of performing the first portion of the first work directly to the first process.

19. The computer-readable medium as recited in claim 12, wherein the second work request is a remote procedure call.

20. A method for processing data on a distributed computing system that includes a plurality of nodes, the method comprising:

maintaining mapping data that specifies work that can be performed by the plurality of nodes; and in response to receiving a first work request to perform first work from a first process on a first node from the plurality of nodes, determining based upon the first work and the mapping data, that the first work is to be performed on a second node from the plurality of nodes, generating an updated first work request that specifies that the first process is to directly receive results of performing the first work, and providing the updated first work request to a second process on the second node.

21. An apparatus for processing data on a distributed computing system, the apparatus comprising a memory carrying instructions which, when executed by one or more processors, cause:

maintaining mapping data that specifies work that can be performed by the plurality of nodes; and in response to receiving a first work request to perform first work from a first process on a first node from the plurality of nodes, determining based upon the first work and the mapping data, that the first work is to be performed on a second node from the plurality of nodes, generating an updated first work request that specifies that the first process is to directly receive results of performing the first work, and providing the updated first work request to a second process on the second node.

22. A computer-readable medium for processing data on a distributed computing system, the computer readable medium carrying instructions which, when executed by one or more processors, cause:

maintaining mapping data that specifies work that can be performed by the plurality of nodes; and in response to receiving a first work request to perform first work from a first process on a first node from the plurality of nodes, determining based upon the first work and the mapping data, that the first work is to be performed on a second node from the plurality of nodes, generating an updated first work request that specifies that the first process is to directly receive results of performing the first work, and providing the updated first work request to a second process on the second node.

* * * * *

UNITED STATES PATENT AND TRADEMARK OFFICE
CERTIFICATE OF CORRECTION

PATENT NO. : 6,920,475 B1
DATED : July 19, 2005
INVENTOR(S) : Klots et al.

It is certified that error appears in the above-identified patent and that said Letters Patent is hereby corrected as shown below:

Column 9,
Line 39, delete "work are to be provided" and insert -- first work are to be provided --.

Column 10,
Line 9, delete "the first portion of the" and insert -- the first portion of the first work, and determining which of the plurality of nodes is allowed to perform the first --.
Line 23, delete "performing the" and insert -- performing the first --.
Line 51, delete "derectly" and insert -- directly --.

Column 12,
Line 50, delete "computer readable" and insert -- computer-readable --.

Signed and Sealed this

Thirteenth Day of September, 2005

JON W. DUDAS
*Director of the United States Patent and Trademark Office*